United States Patent [19]
Martincic et al.

[11] Patent Number: 5,104,028
[45] Date of Patent: Apr. 14, 1992

[54] METHOD FOR JOINING TRANSFORMER COIL CONDUCTORS

[75] Inventors: Paul W. Martincic, Hermitage; Frank W. Benke, Pittsburgh, both of Pa.

[73] Assignee: Electric Power Research Institute, Inc., Palo Alto, Calif.

[21] Appl. No.: 633,938

[22] Filed: Dec. 26, 1990

Related U.S. Application Data

[63] Continuation-in-part of Ser. No. 458,516, Dec. 28, 1989, abandoned.

[51] Int. Cl.$^5$ .............................................. B23K 20/10
[52] U.S. Cl. ................................... 228/111; 228/179
[58] Field of Search ............... 228/110, 111, 170, 171, 228/179, 180.1, 1.1, 5.7, 205; 29/868, 869, 871–873

[56] References Cited

U.S. PATENT DOCUMENTS

| | | | |
|---|---|---|---|
| 411,637 | 9/1889 | Batchelor et al. | 228/171 |
| 1,146,612 | 7/1915 | Carter | 228/171 |
| 3,336,657 | 8/1967 | Flaming | 228/171 |
| 3,634,649 | 1/1972 | Rager et al. | 29/869 |
| 4,219,249 | 8/1980 | Teytaud | 228/110 |
| 4,867,370 | 9/1989 | Welter et al. | 228/110 |

FOREIGN PATENT DOCUMENTS

| | | | |
|---|---|---|---|
| 42-24980 | 11/1964 | Japan | 228/171 |
| 83388 | 3/1989 | Japan | 228/171 |
| 302925 | 9/1981 | U.S.S.R. | 228/110 |
| 1222471 | 4/1986 | U.S.S.R. | 228/171 |

OTHER PUBLICATIONS

IEEE Transactions on Magnetics, "Joining NbTi Superconductors by Ultrasonic Welding", Hafstrom et al., vol. MAG 13, No. 1, Jan. 1977.
Supplement to the Welding Journal, "Diffusion Welding Multifilament Superconductor Composites", Witherell, Charles E., Jun. 1978.
Metals Handbook Ninth Edition, vol. 6, "Ultrasonic Welding", pp. 746–756, copyright 1983.

*Primary Examiner*—Samuel M. Heinrich
*Attorney, Agent, or Firm*—Flehr, Hohbach, Test, Albritton & Herbert

[57] ABSTRACT

A method of joining transformer winding conductor cables is disclosed. The ends of the conductor cables to be joined are first chamfered to both clean and taper the respective ends. The tapered ends are then overlapped and pressed together. Vibratory energy is then applied to at least one of the overlapped ends to weld the cleaned conductor cable ends together to form a joint that has substantially the same cross sectional area as the conductor cables themselves.

10 Claims, 3 Drawing Sheets

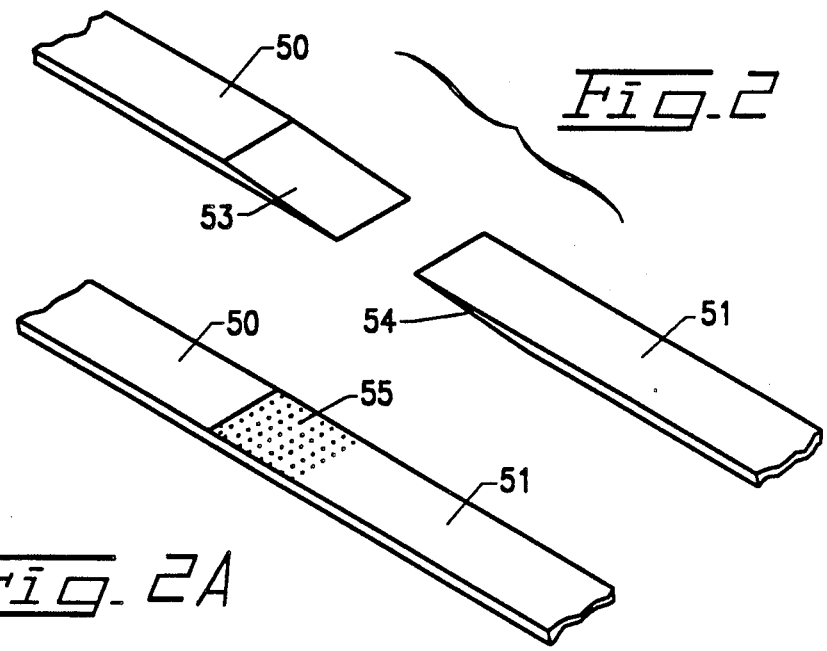
Fig. 2
Fig. 2A
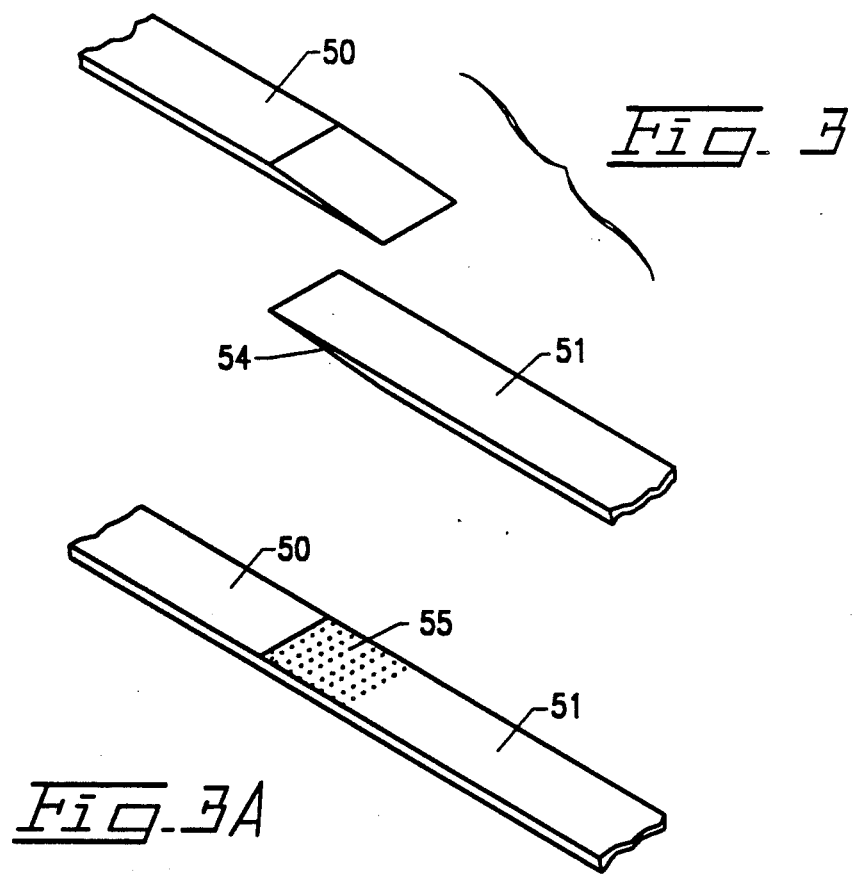
Fig. 3
Fig. 3A

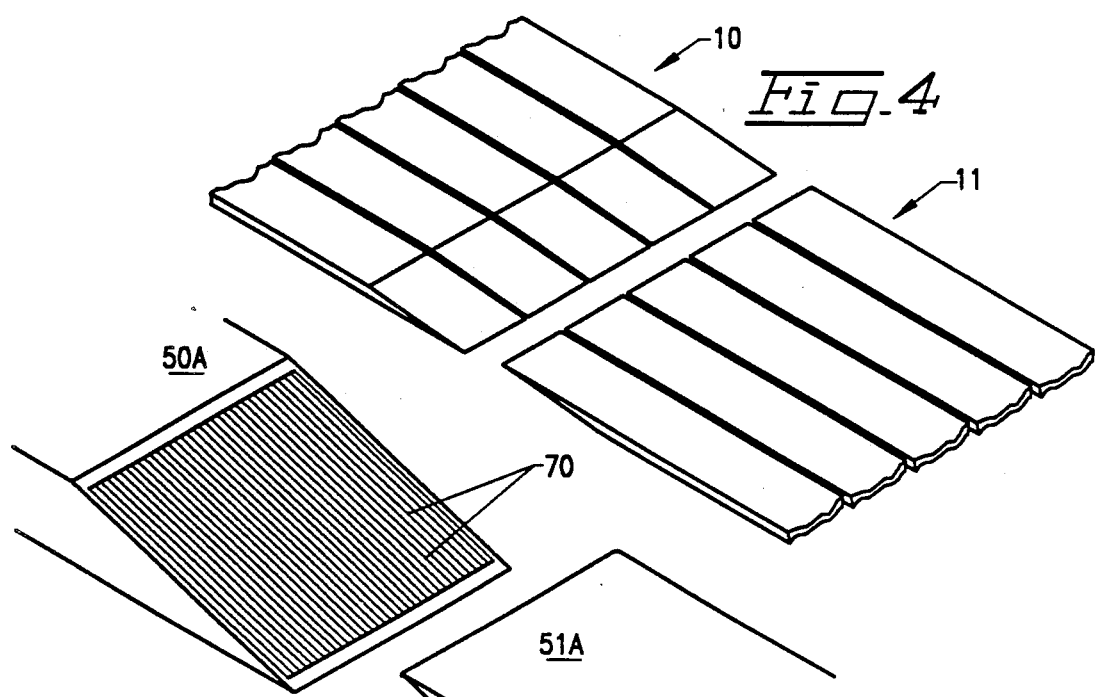
Fig. 4
Fig. 5
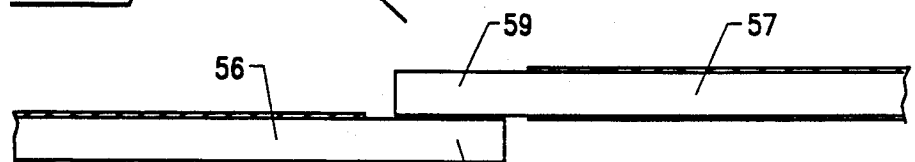
Fig. 6
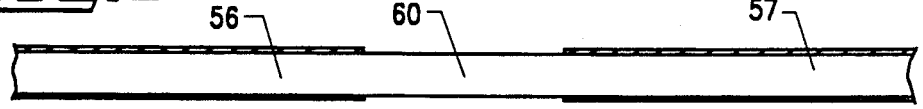
Fig. 7
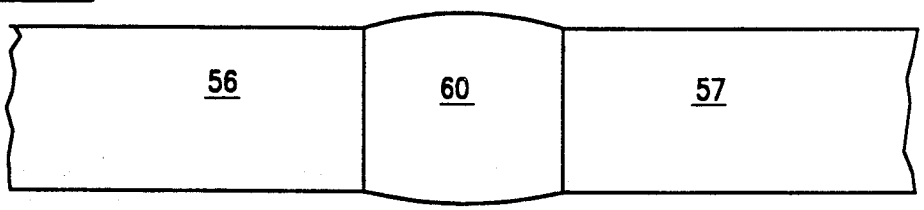
Fig. 8
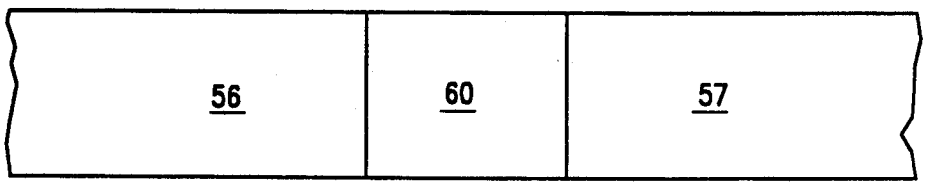
Fig. 9

METHOD FOR JOINING TRANSFORMER COIL CONDUCTORS

This application is a continuation-in-part of application Ser. No. 07/458,516 filed Dec. 28, 1989 entitled METHOD FOR JOINING TRANSFORMER COIL CONDUCTORS, now abandoned.

This invention relates generally to an improved method of fabricating transformer windings. More particularly, an ultrasonic welding technique is used to join elongated conductors.

BACKGROUND OF THE INVENTION

Modern transformer windings are fabricated using a wide variety of methods. In high power applications, one or more substantially rectangular shaped conductor cables are spirally wound about a core to form a coil. Often, the conductive cable itself is composed of a plurality strands arranged side by side in a row. The strands themselves are frequently rectangular to increase the coil's strength and compactness. Each strand is typically coated with an enamel insulation and the strands are further supported by a strip of paper insulation which is adhered to the back side of the conductive cable. A representative conductor construction is disclosed in U.S. Pat. No. 4,489,298.

The conductor cables used for transformer windings are typically fabricated in standard lengths. Therefore, for larger transformers, it is frequently necessary to serially join two or more conductor cables. Additionally, recent research has indicated that more efficient transformers can be produced by winding different portions of certain transformers with conductor strands having different strand configurations. For example, as described in U.S. Pat. No. 4,864,266, it may be desirable to wind the tap and end sections of a core form transformer with conductor strands formed differently than those used in the body section. In such circumstances, the two types of cables must be joined as well.

Two of the methods most commonly used to join conductor cables are brazing and crimping. While these two methods have proven to be reliable conductor joining solutions, they each have several drawbacks as well. In brazing, the end of one cable is overlapped with the beginning of the next cable and the joint is then brazed. Thus, the resultant joint is usually about twice the conductor thickness. Additionally, overlap brazing requires the thorough cleaning of all of the conductor insulation (which is somewhat difficult for multistrand conductor cables). It requires the use of a skilled operator, and the brazing operation itself introduces contaminants to the coil winding and heats both coil conductor and insulation. Crimping typically uses a separate connecting piece that is crimped to the ends of the joined conductors. Like overlapping joints crimped joints are also larger than the conductors themselves in either thickness or width. The connecting pieces required to form non-overlapping joints are undesirable because they require additional cost and are inconvenient. Since the size of the crimp connector will differ for different conductors, additional parts are required to accommodate different conductors. Crimp joints also require the removal of the conductor insulation prior to crimping.

One recently developed method of joining metals together uses an "ultrasonic" or "vibratory" cold welding process. To bond the metals together, high frequency energy is applied to the joint while pressure is applied to push the two parts being cold welded together. The vibratory energy causes one workpiece to undergo relative translating motion with respect to the other and induces a molecular interchange that can form a very strong bond when the vibrations are ended. Representative vibratory welding apparatus are described in U.S. Pat. Nos. 3,029,666; 3,791,569; 3,917,146; and 4,088,257. As described in U.S. Pat. No. 4,047,657, in many instances, insulation, an oxide film, paint or other contaminants are present on the workpiece prior to the cold welding operation. It is therefore frequently necessary to clean the workpiece surfaces to be joined prior to inducing the molecular bonds. One cleaning approach is to divide the vibratory actions into two stages of operation. In the first stage, a rubbing action is provided to clean the surfaces of the workpieces to be joined. In the second stage the molecular interchange is induced. Typically, the vibrational frequencies and amplitudes used for the two stages would be different. Such an approach works well when only thin layers of contaminants are found and the weld does not have to be continuous. However, when thick surface contaminations, such as enamel coating, are present on the workpiece surface, the contaminants tend to interfere with the quality of the welds.

Ultrasonic welding techniques have been used in numerous different applications. For example, U.S. Pat. No. 4,401,252 discloses a method of connecting a starter motor armature coil to a commutator. U.S. Pat. No. 4,712,723 describes a method for bonding an insulated wire to a contact element. Specifically, during the ultrasonic welding operation, the wire's insulation layer is destroyed by mechanical action and the metallic parts are bonded by friction welding and concurrent deformation. However, the deformed area is susceptible to shearing. Accordingly, the '723 patent contemplates applying a suitable adhesive to the bond area to protect its mechanical connection. While such processes are apparently suitable for their intended tasks, they cannot be readily extended to the joining of transformer winding conductor cables which require a bond nearly as strong as the conductor cables themselves and preferably, the formation of a joint which is substantially the same cross section as the cables being joined.

OBJECTS AND SUMMARY OF THE INVENTION

It is a primary objective of this invention to provide a method for joining elongated conductor strands together that creates strong joints that are substantially the same cross sectional area as the strands themselves.

Another object is to provide a method for joining transformer conductor cables using a vibratory welding process.

To achieve the foregoing and other objects of this invention, a method of joining transformer winding conductor cables is disclosed. The ends of the conductor cables to be joined are first chamfered to both clean and taper the respective ends. The tapered ends are overlapped and pressed together. Vibratory energy is applied to at least one of the overlapped ends to weld the cable ends together forming a joint that is substantially the same thickness as the first conductor cable. In a preferred embodiment, both of the conductor cables have a multiplicity of strands which are joined strand for strand.

In an alternative embodiment, the ends are not chamfered but are cleaned to remove the insulation. The pressure used during the welding process is then used to flow the conductor materials to form a joint having the same thickness as the conductor cables.

BRIEF DESCRIPTION OF THE DRAWINGS

The features of this invention that are believed to be novel are set forth with particularity in the appended claims. The invention, together with further objects and advantages thereof, may best be understood by reference to the following description taken in conjunction with the accompanying drawings in which:

FIG. 2 is a diagrammatic perspective view of the chamfered conductor ends of a single strand conductor cable prior to the cold welding operation of the ends along their inclined sides.

FIG. 2A is a diagrammatic perspective view of the conductors shown in FIG. 2 welded together.

FIG. 3 is a diagrammatic perspective view of the chamfered conductor ends of a single strand conductor cable prior to the cold welding operation of the ends when the ends are welded along their flat sides, opposite their inclined sides.

FIG. 3A is a diagrammatic perspective view of the conductors shown in FIG. 3 welded together.

FIG. 4 is a diagrammatic perspective view of a chamfered conductor end of a multiple bundle conductor cable.

FIG. 5 is a diagrammatic perspective view of a chamfered conductor end of a multistrand conductor bundle.

FIG. 6 is a diagrammatic side view of a pair of overlapped non-chamfered conductor cables prior to the cold weld process.

FIG. 7 is a diagrammatic side view of the conductor cables shown in FIG. 6 after the welding operation.

FIG. 8 is a diagrammatic side view of the welded conductor cables shown in FIG. 7.

FIG. 9 is a diagrammatic top view of the welded conductor cables shown in FIG. 8 after the trimming operation.

DETAILED DESCRIPTION OF THE DRAWINGS

Figure 1:
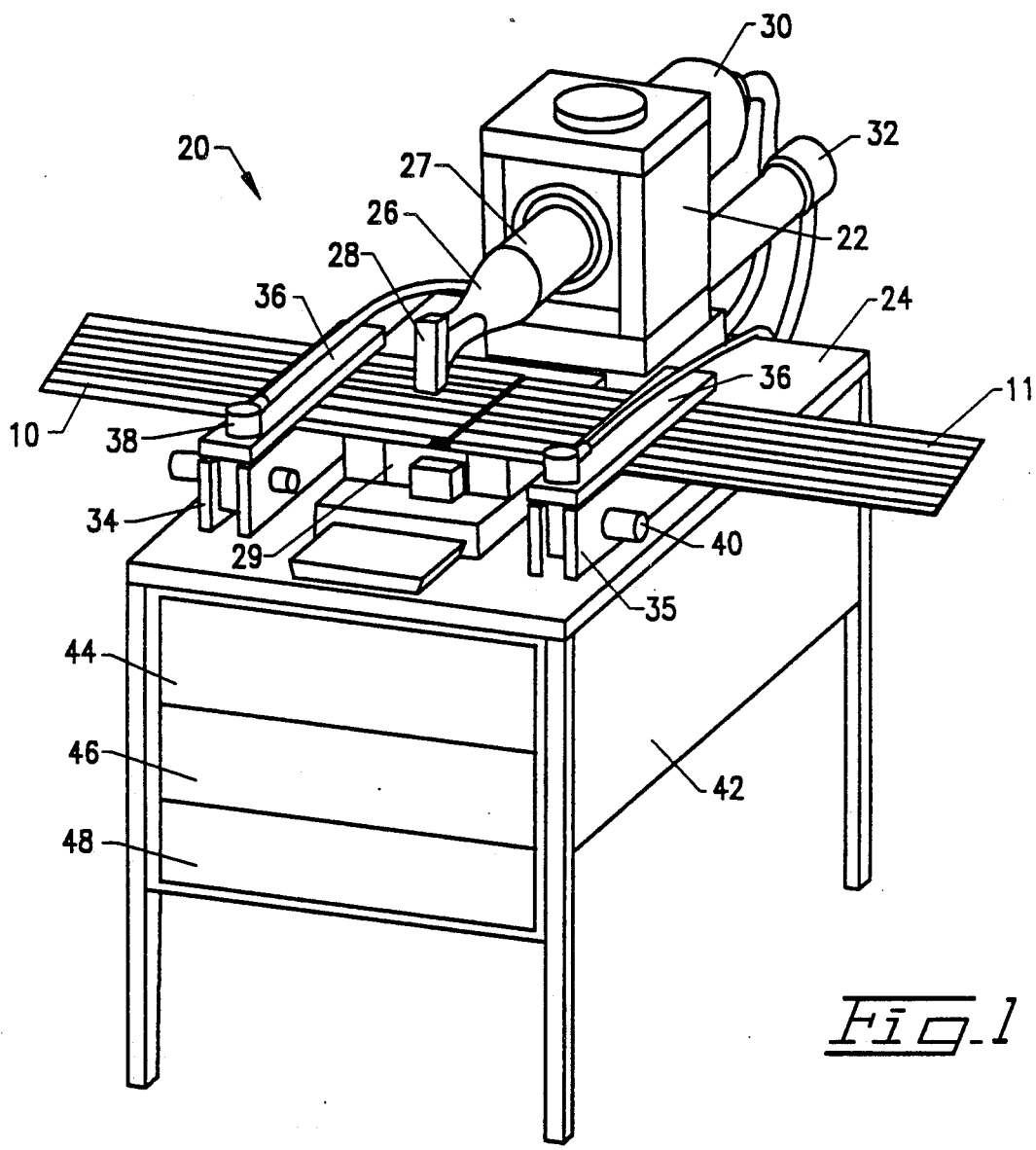
FIG. 1 is a diagrammatic perspective view of a vibratory welding system suitable for joining two elongated conductor cables.

As illustrated in the drawings, a method is disclosed for welding conductor cables together to provide a strong joint that has substantially the same cross sectional area as the conductors being joined. Referring to FIG. 1, an ultrasonic welding apparatus 20 is described that is suitable for carrying out the welding operations described below. The welding apparatus 20 includes a housing 22 mounted to a welding table 24. The housing 22 carries a pneumatically driven horn 26 having an arm 27 that carries an anvil head 28 at its distal tip. The anvil head 28 is positioned over an anvil plate 29 that is fixably mounted to the table 24. A pneumatic cylinder 30 controls the horizontal movement of the arm and vibrates the arm 27 at a very high frequency such that the head 28 vibrates within a horizontal plane. In operation, the workpieces 10 and 11 to be joined are positioned on the table beneath the anvil head 28 within a strike zone that is defined as the region where the anvil head 28 would contact the anvil plate 29. The workpieces are positioned such that their ends are overlapped within the strike zone. Once the workpieces are properly positioned they are secured in place by support clamps 34. The arm 27 is then lowered until the head 28 contacts the upper workpiece. During welding, the pneumatic cylinder 30 causes the arm to both vibrate and apply pressure to the joint region during vibration. In practice, vibrational frequencies in the neighborhood of 20 kHz work well under the influence of a static pressure on the order of 1300 psi. By way of example, a suitable ultrasonic welding apparatus is a 3½ kilowatt lateral drive type ultrasonic welding machine.

The conductor support clamps 34 are slidably mounted to the table 24 on opposite sides of the anvil plate 29. Each support clamp 34 includes a pivotal clamp arm 36, pivotally connected to the clamp base 35 to facilitate opening the clamp to receive a conductor cable to be welded. Since in numerous applications, the conductor cables 10, 11 to be joined will be wider than the anvil head 28, the clamps 34 are slidable along a single axis that is parallel to the table. A pneumatic cylinder 32 secured to housing 22 controls the horizontal movements of the clamps. This allows the entire joint region of the conductors to be joined to be passed back and forth through the contact zone to provide a complete weld.

To weld a particular joint, the clamp arms 36 are lifted and the conductor cables 10, 11 to be joined are placed on the clamps such that their respective ends overlap within the contact zone. The clamp arms are then lowered and locked to the base 35 to firmly hold the conductor cables in places. Pneumatic cylinder 30 is then activated to lower the anvil head 28 into contact with the joint and then vibrates the anvil head 28 at the desired frequency to complete the cold weld. When the conductor cables 50($a$) and 51($a$) are wider than the width of anvil head 28, the support clamps are slid back and forth relative to the table top 24 to allow the entire joint to pass through the contact zone.

The table 24 has a cabinet 42 which houses the pneumatic and electrical components necessary to drive the horn 26. The cabinet can also house any required quality control electronics.

Referring next to FIG. 2, in the first described method of welding transformer conductor cables together, the ends 53, 54 of conductor cables 50, 51 to be joined are first chamfered in a complementary manner. The chamfered ends are obtained using a conventional scarfing process. It should be appreciated that any insulation on the conductor cable such as enamel or paper, will be removed from the chamfered surface by the scarfing operation. The complementary conductor cable ends 53 and 54 are then mated in the contact zone beneath the anvil head 28 and the welding process is initiated. It should be appreciated that since the chamfered ends are overlapped, the resultant joint is substantially the same width and thickness as the cables 50 and 51 respectively. This feature is depicted in FIG. 2A.

To insure good joint strength, the duration, frequency and amplitude of the vibrations used in the welding process are preferably arranged to provide a weld having a tensile strength that is at least approximately 80% of the tensile strength of the cable strands used.

FIG. 3 depicts a particularly successful embodiment of the present invention. In this embodiment, the chamfered ends, or inclined ends, are joined in a noncomplementary manner. That is, the inclined ends are facing outward, opposite to one another, while the flat sides are welded together. The resultant joint is depicted in FIG. 3A.

Referring next to FIGS. 4 and 5, it should be apparent that the described chamfering process can also be used to couple conductor cables having multiple conductor bundles as seen in FIGS. 1 and 4. In such an embodiment, the ends of each of the bundles in conductor cables 10 and 11 are chamfered. Since conductor straps having several conductor bundles will typically be wider than the anvil head 28, the cables will be moved through the contact zone by clamps 34 as described above.

Similarly, conductor straps or bundles 50(a) and 51(a) having multiple insulated strands 70, as shown in FIG. 5, can be readily joined using the same process as well. The multistranded conductor straps may be arranged to provide substantially strand for strand mating between the various conductor strands of the straps being joined. It should be apparent that the chamfered ends of the conductor bundles allow welding without requiring the conductive materials to flow a great deal during the welding process. Therefore, the enamel strand insulation common on multistrand bundles will not substantially interfere with the welding process. welding process will be described. In the second described process, the conductor ends are first bared using conventional stripping techniques. The bared strips are then overlapped and placed within the contact zone beneath the anvil head 28 of welding apparatus 20 as seen in FIG. 6. The pneumatics driving the anvil head 28 are then arranged to apply sufficient pressure during the welding operation to flatten the overlapped area to the width of a single conductor cable. It will be appreciated that with such an arrangement, a substantial amount (approximately half) of the overlapped material will need to flow from the joint region. As seen in FIG. 8, in one embodiment a substantial percentage of these materials flow to the outside of the combined cables (while some portion will go to elongation of the combined cable if the clamps 36 are loose enough to allow some axial movement of the conductor). The excess material 62 can then be ground away from the sides of the joint using traditional grinding techniques. The sides are ground to form a joint 60 having the same cross sectional area as the conductor cables 56, 57 as seen in FIG. 9.

Alternatively, the cables may be placed within a trough during the vibratory welding step. The trough causes all the excess joint materials to cold flow in a longitudinal direction which results in an elongation of the conductor as opposed to excess material. With such arrangement there is no need to trim excess materials away from the sides of the conductor.

Although only a few embodiments of the present invention have been described herein, it should be understood that this invention may be embodied in many other specific forms without departing from the spirit or scope of the invention. Therefore, the present examples and embodiments are to be considered as illustrative and not restrictive, and the invention is not to be limited to the details given herein, but may be modified within the scope of the appended claims.

We claim:

1. A method of joining conductor cables for transformer windings comprising the steps of:
    chamfering the end of a first insulated rectangular conductor cable;
    chamfering the end of a second insulated rectangular conductor cable;
    overlapping the chamfered ends of the first and second conductor cables and joining the overlapped cable ends by pressing the overlapped cable ends together and applying vibratory energy to at least one of the chamfered conductor cable ends to weld the chamfered conductor cable ends together to form a joint, wherein the chamfered ends are overlapped such that the thickness of the joint is not substantially thicker than the thickness of the first conductor cable.

2. A method as recited in claim 1 wherein the first insulated conductor cable has a multiplicity of strands.

3. A method as recited in claim 2 wherein the second insulated conductor cable has a multiplicity of strands.

4. A method as recited in claim 1 wherein the cross sectional area of the joint is substantially the same as the thickness of the first conductor cable.

5. A method as recited in claim 1 wherein the chamfering steps are accomplished by scarfing the conductor ends, and the scarfing also removes the insulation from the portions of the conductor cables to be joined.

6. A method as recited in claim 1 wherein the overlapping step is accomplished by placing the chamfered ends in a noncomplementary relationship.

7. A method of joining conductor cables for transformer windings comprising the steps of:
    chamfering and cleaning the end of a first rectangular conductor cable;
    chamfering and cleaning the end of a second rectangular conductor cable;
    overlapping the ends of the first and second conductor cables, pressing the overlapped cable ends together, and applying vibratory energy to at least one of the overlapped conductor cable ends until the cleaned conductor cable ends are welded together to form a joint that is substantially the same thickness as the first conductor cable.

8. A method as recited in claim 7 wherein the pressure exerted onto the overlapped conductor cables while applying said vibratory energy causes excess joint materials to migrate along the length of the conductor cable and thereby extend the length of the conductor cable without leaving substantial excess materials on the sides of the cable.

9. A method as recited in claim 7 wherein the pressure exerted onto the overlapped conductor cables while applying said vibratory energy causes excess joint material to flow to the sides of the conductor cable, thereafter said excess joint material is trimmed from the sides of the joint.

10. A method as recited in claim 7 wherein the overlapping step is accomplished by placing the chamfered ends in a noncomplementary relationship.

* * * * *